July 14, 1931.  F. M. JOSLIN  1,814,043

MACHINE FOR MAKING BOXES

Filed April 11, 1929   6 Sheets-Sheet 5

Patented July 14, 1931

1,814,043

UNITED STATES PATENT OFFICE

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK

MACHINE FOR MAKING BOXES

Application filed April 11, 1929. Serial No. 354,353.

This invention relates to a machine for making paper boxes, in which the sides and ends of the box are folded over to make the same of double thickness. The invention contemplates certain improvements over the machines shown in my prior Patents Nos. 1,856,771 and 1,400,292.

One object of the present invention is to provide a plunger for machines of this character which is positive and certain in its actions and in which both parts of the same are adapted to be positively moved, thus dispensing with the use of springs in the plunger as in the constructions of my said prior patents.

A further object of the invention is to provide a plunger in which both parts of the same will be simultaneously withdrawn from the die after the operation of folding the box is completed.

A still further object is to provide a plunger in which the parts thereof are yieldingly locked together in two different positions and in which adjustable friction means are provided for holding said parts in their desired relation at all times.

Another object of the invention is to provide certain detailed improvements in the die employed with machines of this kind.

Still another object is to provide certain improved feeding mechanism for feeding the box blanks to the die.

The invention also contemplates various other detailed improvements which will appear from the accompanying specification and claims.

My improved construction is set forth in detail in the following specification and is illustrated in the accompanying drawings forming a part thereof, it being understood that various changes in the details may be resorted to within the contemplated scope of the invention as hereinafter described and claimed. In the accompanying drawings:

Figures 11, 12, 13:
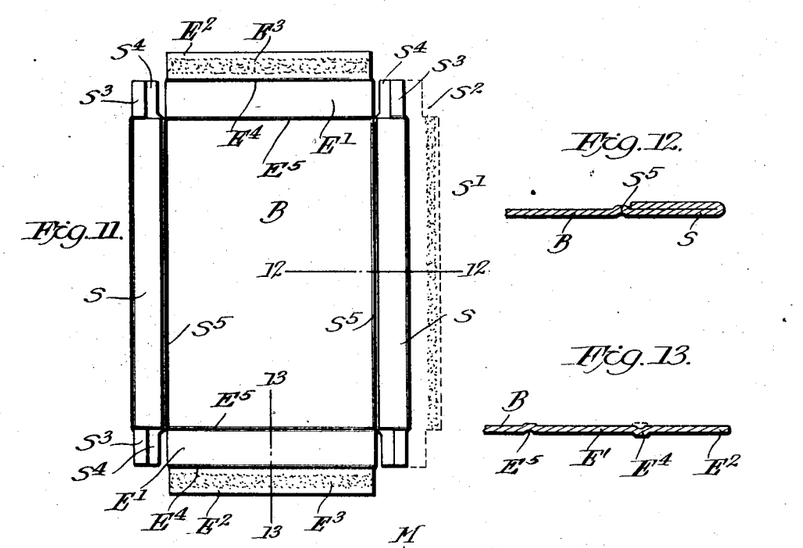
Figure 11 is a plan view of one of the box blanks on which the machine is adapted to operate.
Figures 12 and 13 are respectively cross sections on the lines 12—12 and 13—13 of Fig. 11.
Figure 14:
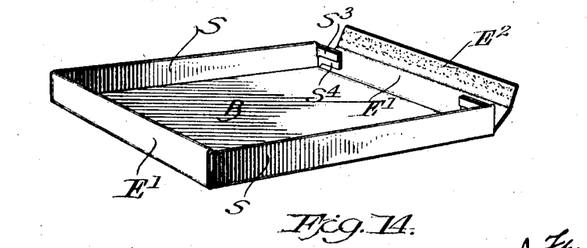
Figure 14 shows one of the boxes which the machine is adapted to produce, in this figure one of the ends of the box being shown in its partially folded position.

The machine is designed to operate upon previously prepared box blanks such as shown in full lines in Fig. 11 and to fold the sides and ends of the same to form a box or tray. The body B of the blank has the sides S folded and glued together to form a double thickness of material. In cutting the blanks the corners are cut away as shown at $S^2$ so that the glue $S'$ does not extend entirely to the ends of the sides. The result is that the sides S at each end have the tongues $S^3$, $S^4$ which are not glued together. This permits such tongues to be folded around as shown in Fig. 14 without buckling. The blanks are scored along the lines $S^5$ to facilitate upward folding of the sides S. The ends of the blank consists of two portions $E'$, $E^2$. The present machine applies glue to the portions $E^2$ as shown at $E^3$ and also scores the same along the line $E^4$, scores $E^5$ being previously made in forming the blank. The machine finally folds the sides S of the blank upwardly and turns the tongues $S^3$, $S^4$ inwardly, and it also folds the ends $E'$ upwardly and folds the portions E² inwardly and downwardly over the tongues S³, S⁴ and against the inner surface of the side portions E'.

Figure 15:
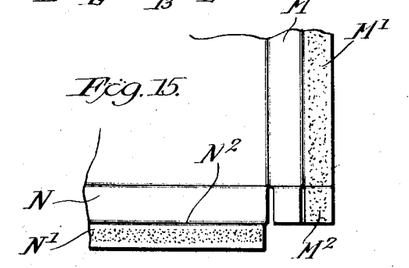
Figures 15 and 16 illustrate a slightly modified form of box blank.
Figure 16:
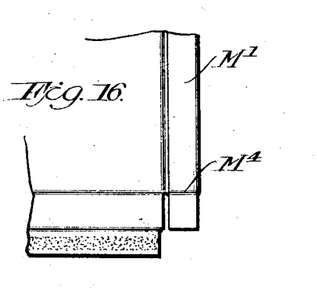

With the form of blank shown in Figs. 15 and 16, the sides are made up of the portions M, M', the latter being folded over on the former, but the ends M² of the portion M' are not cut away but are folded over on top of the portions M. When this form of blank is used, the machine is provided with a scoring roll adapted to make a score at M⁴ so that the extreme ends of the sides may easily fold inwardly as previously described. The ends N, N' in this form of blank are substantially the same as that shown in Fig. 11, the machine having rolls to score such blank along the lines N².

Referring now to the accompanying drawings of the machine, the letter F indicates generally the frame thereof, in which the main drive shaft 10 is supported and to which power is applied from any suitable source as the belt wheel 11, a clutch device 12 operated by a rod 13 from a handle 14 serving to connect and disconnect the shaft and belt wheel 11 at will. The shaft 10 is connected through gears 10a and 10b to a shaft 15 extending longitudinally beneath the main frame F of the machine.

Mounted on the frame F is a guide 20 in which a slide 21 reciprocates vertically and from which the horizontal arm or cross head 22 extends, the latter serving to operate the plunger, as later described. The lower end of the slide 21 is provided on one edge with rack teeth 21a which are engaged by a gear wheel 23 mounted on a shaft 24 carrying a second gear wheel 25 which in turn meshes with a rack 26. The rack 26 is connected to a slide 27 which reciprocates between guides 28, being thus reciprocated in opposite directions by means of cams 29 secured on the shaft 15. By this means the slide 21 is given its reciprocating motion.

Pivoted on a standard 30 connected to the frame F is a rocking lever 31. As this lever is rocked, it transmits motion to a part of the plunger, as hereinafter described. The lever 31 is operated through the medium of a slide 32 mounted in a guide 33 and carrying a cam roller 34 which contacts with a cam 35 on a shaft 36, the latter being operated by a sprocket chain 37 from a shaft 38 extending transversely beneath the machine frame and connected by bevel gears 39 to the shaft 15.

The die of the machine in which the blanks are folded and compressed, is illustrated generally at 40. One side or wall 40a of the die is made movable and the same is operated by a slide 41 to which said wall is secured and connected to the slide 41 are toggle links 42, the joints of which are engaged by cams 43 mounted on a shaft 44 which is rotated by means of a sprocket chain 45 driven from the shaft 15. The cams 43 move the wall 40a toward the opposite wall of the die and the slide and movable wall are forced back by means of springs 41a engaging the slide.

The die is provided with a vertically movable member 46 which is supported on standards 47 which extend downwardly through the frame of the machine and are connected by a cross head 48 which in turn is connected to a lever 49 intermediate its ends. One end of the lever 49 is pivoted at 50 to a projection on the machine frame and the other end thereof, through the medium of a roller, bears upon a cam 51 carried by the shaft 15. By this means the member 46 of the die is caused to move downwardly into the die at certain intervals, this movement, of course, taking place in timed relation with the movements of the plunger, as hereinafter described, and the movements of the side wall 40a of the die.

Figure 1:
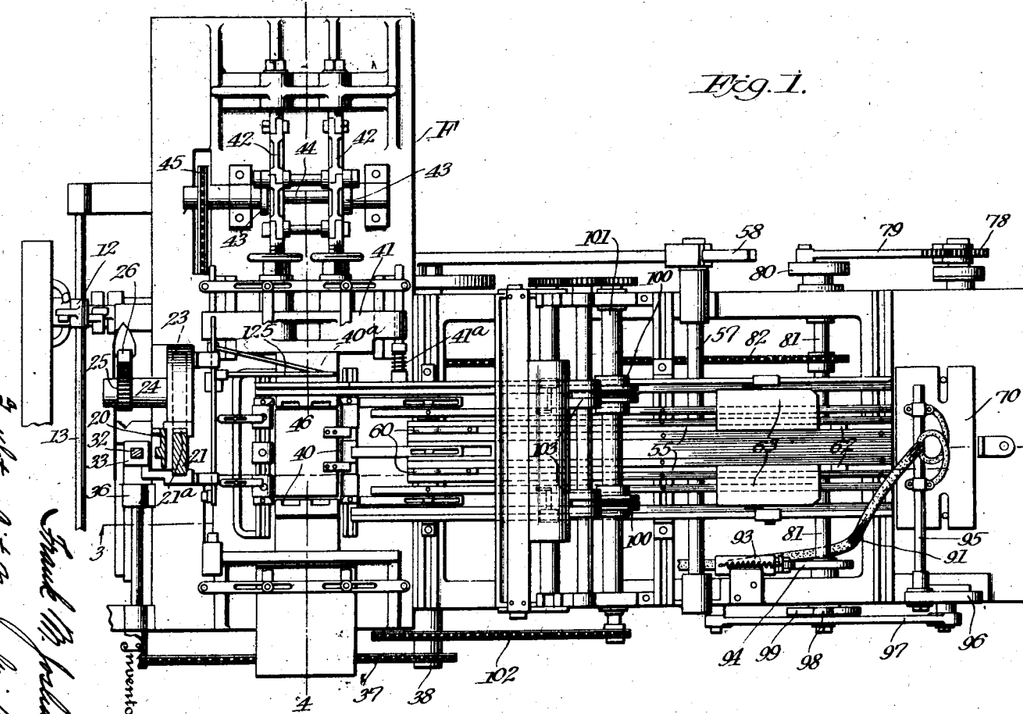
Figure 1 is a plan view of the machine with certain parts removed therefrom.
Figures 2, 4, 10:
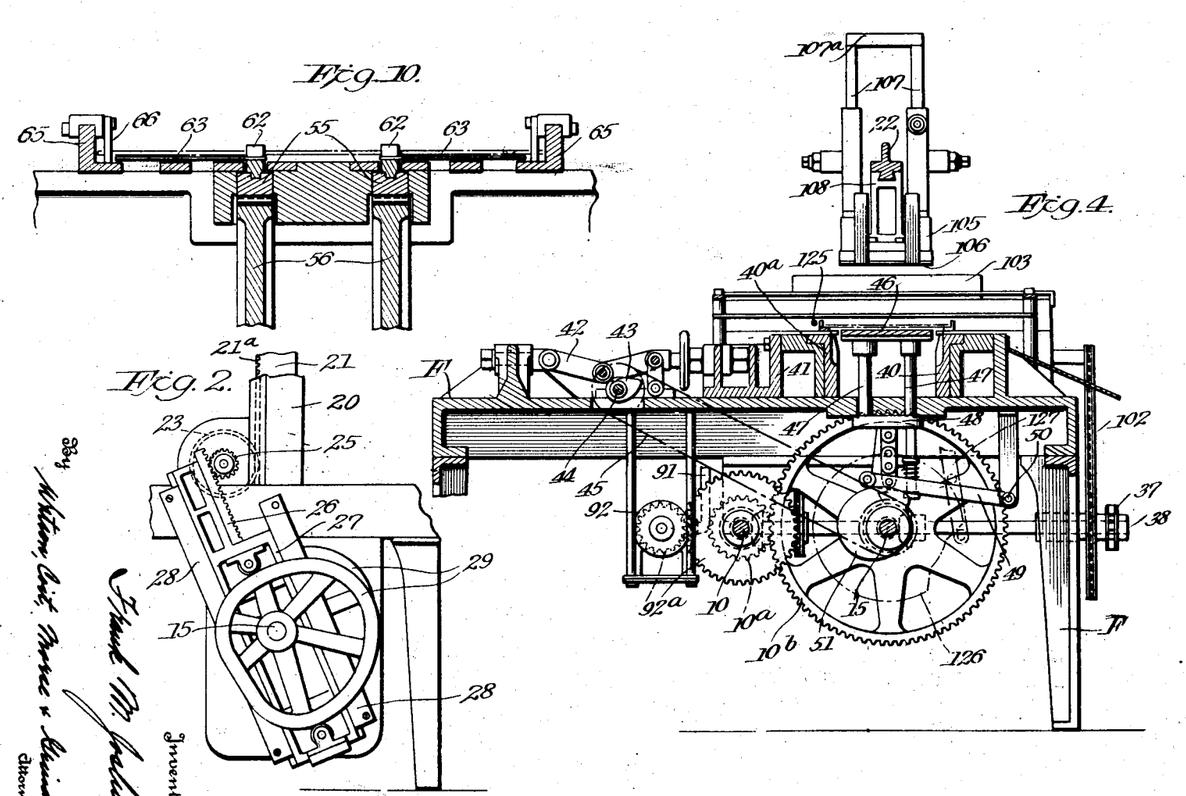
Figure 2 is an end view of the same.
Figure 4 is a transverse section on the line 4—4 of Fig. 1.
Figure 10 is an enlarged detail view of part of the feed mechanism.

The mechanism for feeding the box blanks to the die comprises two parallel racks 55 arranged to slide in the frame of the machine. These racks are reciprocated through gears 56 secured to the transverse shaft 57, the end of which is provided with another gear engaged by a rack bar 58 operated by a crank disk 59 secured to the transverse shaft 38. The rack bars 55 are provided at spaced intervals with upwardly projecting lugs 60, 61 and 62, the purpose of which will later appear. Secured to the upper surface of the rack bars 55 are plates which form in effect a platform 63 on which the blanks are deposited as the platform is moved to its extreme right-hand position (Fig. 1) as later pointed out. Arranged on each side of the rack bars 55 and spaced therefrom are stationary bars 65 and pivotally depending from these bars are holding dogs 66 and 67.

From the foregoing it will be understood that as the platform 63 connected to the rack bars 55 is moved to the right and a blank is deposited thereon, the blank will be carried toward the left on the return movement of the platform, the blank being pushed along by means of the lugs 62. The platform is moved a sufficient distance to bring the rear end of the blank past the first set of dogs 66, after which the racks again move toward the right. Such movement will bring the dogs 61 back of the rear edge of the blank and on the next movement of the racks toward the left, the dogs 61 will push the blank a second step toward the die or, in other words, will push it past the second set of dogs 67. Upon the next reciprocation of the racks 61, the lugs 60 thereof will come behind the rear edge of the blank and push it into position on the die.

The blanks are supplied to the platform 63 by means of the following mechanism: Arranged adjacent the end of the machine is a blank support 70 which is adapted to carry a pile of blanks 70a. The support 70 is carried by a rack bar 71 which slides through a casing 72 secured to the machine frame. A gear wheel 73 mounted in the casing 72 engages the rack bar 71 and this gear wheel is frictionally connected to a worm wheel 74 which is operated by a worm 75 on a shaft 76, the latter being connected through a one-way clutch 77 to a gear wheel 78 which in turn is operated by a rack bar 79 connected to a crank 80 mounted on the transverse shaft 81. The shaft 81 is rotated from the shaft 38 through the sprocket chain 82.

The worm wheel 74 and the hub of the gear wheel 73 are provided with inter-engaging frictional surfaces, indicated at 83. The gear wheel 73 is connected to a short shaft 84 which projects through the casing 72, the worm wheel 74 being freely rotatable on this shaft. By moving the shaft 84 longitudinally inwardly or outwardly, the gear wheel 73 may be disconnected from the worm wheel 74. This mechanism serves as a friction clutch by which movement of the blank support 70 may be stopped at any time desired.

The rack bar 71 is also engaged by a second gear 85 connected to a shaft 86 provided with a handle 87 whereby the support 70 may be operated manually whenever desired.

Pneumatic mechanism is provided for lifting the blanks one by one from the pile and depositing the same on the platform 63. This mechanism comprises suction cups indicated at 90 which are connected by a hose 91 to a pump arranged at any suitable point, being indicated at 92 adjacent the shaft 10 and operated through gears 92a rotated from said shaft. Suitable valve mechanism is provided for breaking and restoring the suction in the suction heads 90 at proper intervals, such mechanism being shown at 93 and being operated by a cam 94 secured to the shaft 81.

The suction heads 90 are carried on a transverse bar 95 connected to a slide 96 which is operated by a lever 97 pivoted to the frame of the machine and having intermediate its ends a wheel 98 bearing on a cam 99 secured to the shaft 81.

Figure 7:
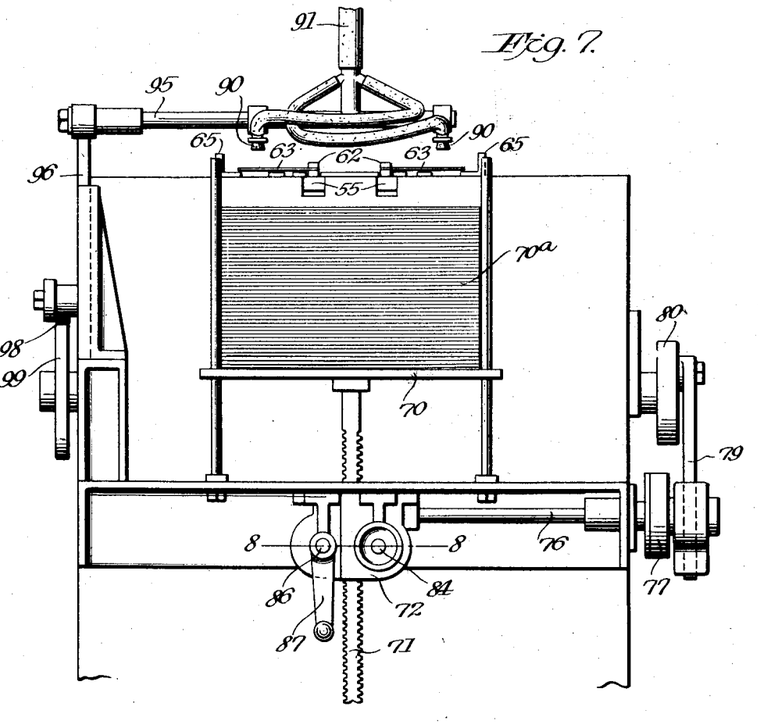
Figure 7 is an enlarged end elevation showing the feeding mechanism.
Figure 8:
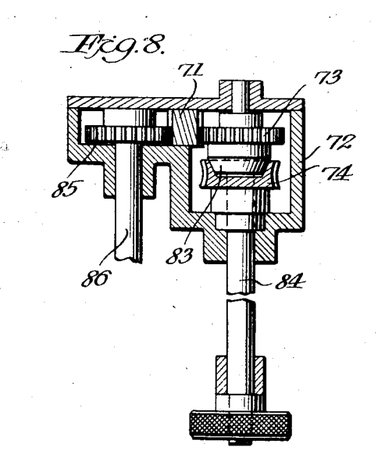
Figures 8 and 9 are enlarged details of the mechanism employed for elevating the support on which the box blanks are placed.
Figure 9:
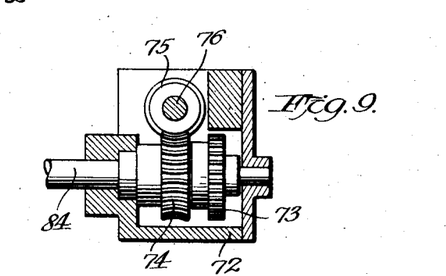

It will be understood that the parts are so timed that the suction heads 90 will move down and pick up a box blank from the pile 70a and move upwardly substantially to the position shown in Fig. 7, after which the platform 63 will be moved under the suction heads 90 and the suction being broken at that time, the blank will be deposited on the platform 63 and moved toward the die, as before described. After the platform 63 moves to the left, the suction heads will again descend and pick up another blank and the operation will thus be repeated.

As the blanks are moved toward the die they pass beneath the creasing rolls 100 which score the same along the line $E^4$, heretofore mentioned (Fig. 11). These creasing rolls are secured to the transverse shaft 101 which is rotated through a sprocket chain 102 from the transverse shaft 38. Other scoring rolls may also be applied to the shaft 101 for producing the scores $M^4$ in the modified form of blank heretofore mentioned (Figs. 15 and 16). As the blanks pass through the rolls, glue is applied to the portions $E^3$ thereof, as previously indicated (Fig. 11), such glue applying apparatus being substantially the same as that shown in my said prior patents and indicated generally at 103 and being driven by suitable gears from the scoring roll shaft 101.

Some of the main features of the present invention relate to the plunger which is employed to force the blanks into the die and turn or fold the edges of the same to form the completed box. This plunger comprises a body portion 105 and a bottom portion 106, the latter being movable toward and from the former and the bottom portion has a plurality of guides 106a extending upwardly and slidably engaging notches in the sides of the body portion 105, these guides serving to align the parts of the plunger. The bottom portion 106 also has secured thereto standards 107 which extend upwardly through suitable openings in the body portion 105 and which are connected at their upper ends by a cross bar 107a. This body portion 105 is connected to the reciprocating cross head 22, heretofore mentioned, through the medium of a member 108, the bottom of which is provided with lateral flanges 108a which are engaged by angle bars 109 secured to the bottom portion 106 of the plunger. The connection between the member 108 and the portion 105 of the plunger is such as to permit limited sidewise or lateral movement of the latter, as will clearly appear from Figs. 5 and 6. Such limited lateral movement is yieldingly resisted by means of a coiled spring 110 mounted in a socket in the member 108 and arranged to engage the body portion 105 of the plunger.

The limited lateral movement of the body portion 105 of the plunger is provided so that when this portion of the plunger enters the die and the movable wall 40a is advanced against the plunger to tightly press the folded parts of the box together, the plunger will be capable of yielding to a slight degree laterally.

The standards 107 of the bottom portion 106 of the plunger have connected thereto pivoted wings 111 which normally swing outwardly under the influence of springs 112, such outward movement being limited by stops 113. It will be understood that when the bottom portion 106 of the plunger is moved into proximity to the body portion 105, or vice versa, the wings 111 will be caused to swing inwardly on their pivots and when the two portions of the plunger are brought into contact these wings will be housed in recesses 105a of the body portion.

Figures 5, 6:
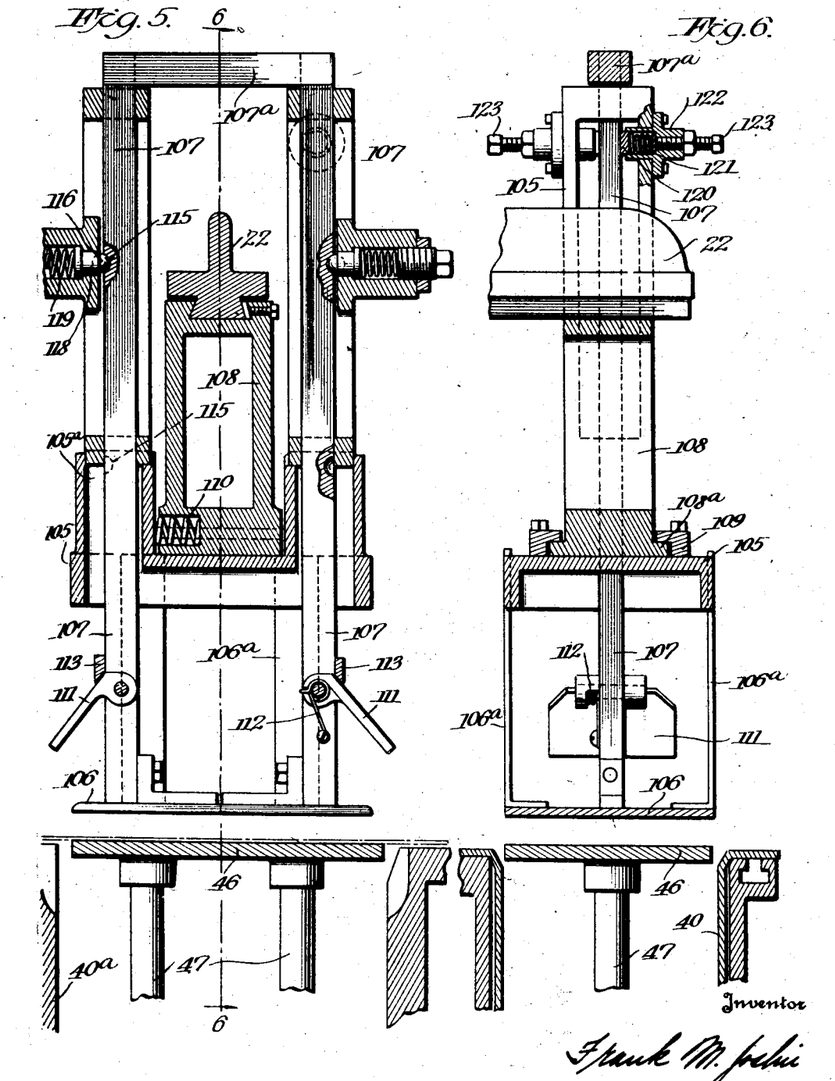
Figure 5 is an enlarged elevation partly in section showing the plunger and associated mechanism.
Figure 6 is a sectional view on the line 6—6 of Fig. 5.

Means are provided for yieldably locking the two portions of the plunger together in two different positions, one position being that in which the bottom portion is remote from the body portion, as illustrated in Fig. 5, and the other being that in which the bottom portion is adjacent to or in contact with the lower end of the body portion. Such locking means comprise recesses 115 formed in the standards 107, two of these recesses being at one level and two at a lower level. These recesses are adapted to be engaged by spring pressed balls 116 mounted in housings 117 secured to the body portion 105 of the plunger. The balls 116 are backed up by plugs 118 engaged by coiled springs 119 arranged in the housings 117. The tension of the coiled springs 119 can be regulated by screw plugs 119a threaded into the housings 117.

From the foregoing it will be apparent that when the bottom portion 106 of the plunger is forced downwardly into the position shown in Fig. 5, the balls 116 will enter the upper recesses 115 and yieldably lock the two parts of the plunger together. Also when the bottom portion 106 is moved upwardly or when the body portion 105 is moved downwardly, the balls 116 will enter the lower recesses 115 to lock the parts together in the other position.

The body portion 105 of the plunger is provided with means for frictionally engaging one or both of the standards 107 on the bottom portion. As illustrated particularly at the top of Fig. 6, such friction means comprises a friction plate 120 backed up by a spring 121 mounted in a housing 122 secured to the upper part of the body portion 105 of the plunger. The tension of the spring 121 can be regulated by an adjustable screw 123 threaded into the housing.

A brief description of the operation of the machine will suffice. As before noted, the blanks are lifted from a pile by the suction apparatus and by means of the reciprocating feeding device they are moved into position above the die, the glueing and scoring operation taking place during such feeding movement. As the blanks are moved to the die, they are positioned on the member 46 beneath the plunger. With the parts of the plunger in the position shown in Fig. 5, the cross head 22 is moved downwardly, carrying with it the body portion 105 of the plunger and also the bottom portion 106 thereof. When the latter comes in contact with member 46 of the die, the blank will be clamped in position. Further downward movement of the bottom portion 106 of the plunger is momentarily prevented and consequently the yieldable locking means between the two portions of the die will break or yield and the body portion 105 of the plunger will continue its downward movement during which time the bottom portion 106 of the plunger is held firmly in contact with the blank due to the friction between the two parts of the plunger produced by the friction plates 120. As the body portion of the plunger continues its downward movement, the lower end thereof strikes the wings 111 and swings the same inwardly. Just prior to the time the body portion 105 strikes the wings 111, the member 46 of the die yields and permits the bottom portion 106 of the plunger to move downwardly into the die. As this takes place the edges of the box blank are folded upwardly by the sides of the die. When the member 46 of the die reaches its innermost position, further downward movement of the portion 106 of the plunger is stopped and as the portion 105 continues to move downwardly the wings 111 are swung inwardly and these wings contact with the edge portions E² of the box blank and bend the same inwardly in the path of the descending body portion 105. These inwardly bent edges of the blank are therefore struck by the body portion of the plunger as it continues to descend and are further bent into a substantially vertical position or in contact with the portions E' of the box. As the body portion of the plunger thus moves downwardly into the die and folds the margins of the box blank inwardly against the sides thereof, the wall 40a of the die moves inwardly and tightly grips the plunger, thus pressing the folded edges of the body tightly together.

Figure 3:
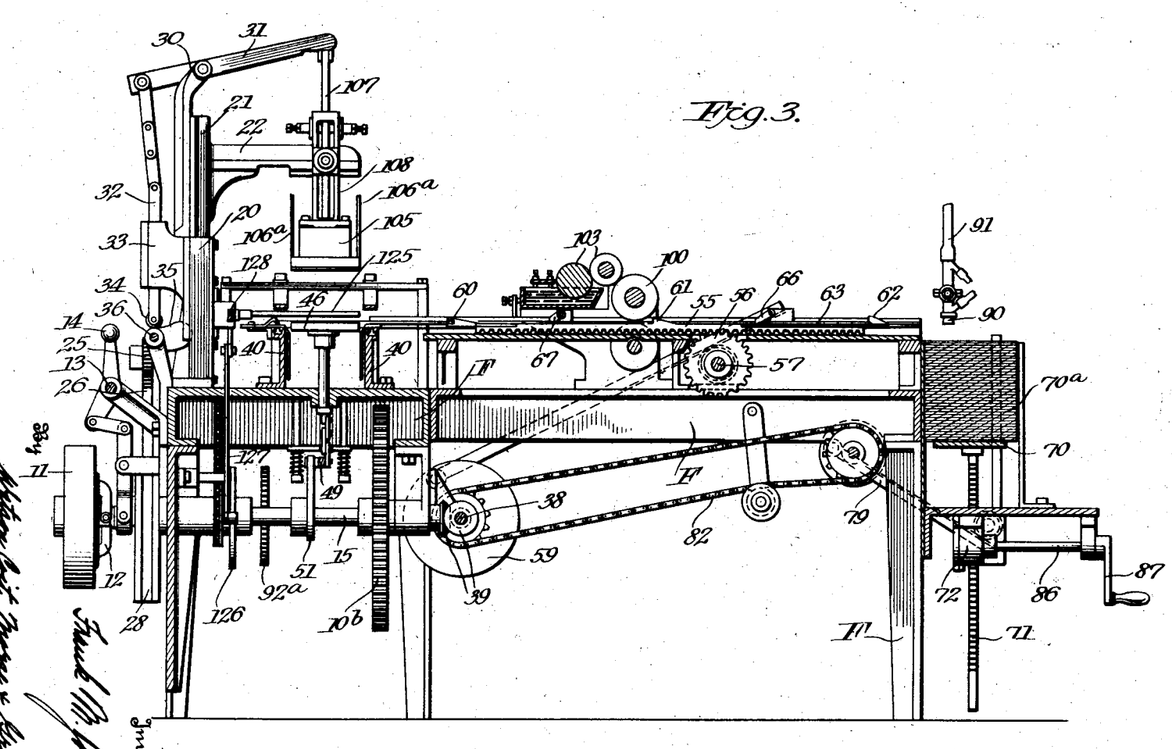
Figure 3 is a longitudinal section on the line 3—3 of Fig. 1.

When the body portion of the plunger is thus forced downwardly to its lowest position, the parts thereof will be locked together by reason of the spring-pressed balls 116 entering the lower recesses 115. Consequently when the cross head 22 is again raised, both parts of the plunger will be moved upwardly and the lower portion thereof will be positioned against or adjacent to the body portion, as illustrated particularly in Fig. 3.

In order to restore the parts to the position shown in Figs. 5 and 6, the lever 31 is now operated by the means heretofore described, which contacts with the cross head 107a and moves the same downwardly along with the standards 107 and the bottom portion 106. When the bottom portion of the plunger is thus moved downwardly, the wings 111 will swing outwardly into their normal position, as shown in Fig. 5, and the parts will be in the position for another operation.

After the boxes are completed, they are pushed upwardly from the die by the member 46 upon its return movement, and an ejector bar 125, operated from a cam 126 through a lever 127 and slide 128, serves to eject the box laterally from the machine.

Having thus described the invention, what is claimed as new and desired to be secured by Letters Patent is:

1. In a machine of the kind described, the combination of a die and a plunger cooperating therewith, said plunger comprising a body portion and a bottom portion, yieldable means for locking said portions together with said bottom portion in advance of or in proximity to said body portion, and means for simultaneously moving said portions respectively toward or away from the die when thus locked together.

2. In a machine of the kind described, the combination of a die and a plunger cooperating therewith, said plunger comprising a body portion and a bottom portion movable relative to each other, separate means for moving said portions toward said die, one of said means serving to simultaneously move said portions away from said die.

3. In a machine of the kind described, the combination of a die and a plunger cooperating therewith, said plunger comprising a body portion and a bottom portion movable relative to each other, means for first moving said bottom portion a predetermined distance toward said die and separate means for thereafter simultaneously moving said portions toward said die.

4. In a machine of the kind described, the combination of a die and a plunger cooperating therewith, said plunger comprising a body portion and a bottom portion movable relative to each other, means for first moving said bottom portion a predetermined distance toward said die while said body portion is held stationary and separate means for thereafter simultaneously moving said portions toward said die.

5. In a machine of the kind described, the combination of a die and a plunger cooperating therewith, said plunger comprising a body portion and a bottom portion movable relative to each other, means for moving said plunger toward and from said die, and yieldable means for locking said portions together in two different positions.

6. In a machine of the kind described, the combination of a die and a plunger cooperating therewith, said plunger comprising a body portion and a bottom portion movable relative to each other, means for moving said plunger toward and from said die, yieldable means for locking said portions together in two different positions and adjustable friction means carried by one of said portions and engaging the other portion.

7. In a machine of the kind described, the combination of a die and a plunger cooperating therewith, said plunger comprising a body portion and a bottom portion movable relative to each other, means for first moving said bottom portion a predetermined distance toward said die, yieldable means for locking said bottom portion to said body portion after the former has been moved as aforesaid, and separate means for thereafter simultaneously moving said portions toward said die.

8. In a machine of the kind described, the combination of a die and a plunger cooperating therewith, said plunger comprising a body portion and a bottom portion movable relative to each other, mechanism for moving said bottom portion toward said die, yieldable means for locking said portions together after the bottom portion has been moved toward the die, and other mechanism operating in timed relation with said first named mechanism for thereafter simultaneously moving both said portions toward said die.

9. In a machine of the kind described, the combination of a die and a plunger cooperating therewith, said plunger comprising a body portion and a bottom portion, said bottom portion being movable into a position remote from or adjacent to said body portion, yieldable means for locking said portions together in each of said positions, and means for moving both of said portions toward and from the die.

10. In a machine of the kind described, the combination of a die and a plunger cooperating therewith, said plunger comprising a body portion and a bottom portion, yieldable means for locking said portions together with the bottom portion in advance of the body portion, reciprocating means for simultaneously moving said portions toward the die when thus locked together, means associated with said die for contacting with and stopping movement of said bottom portion while said body portion continues its movement toward the die, thereby breaking said first named locking connection between said portions, said reciprocating means serving to simultaneously withdraw said portions from the die, and means for holding said portions against relative movement while being thus withdrawn.

11. In a machine of the kind described, the combination of a die and a plunger cooperating therewith, said plunger comprising a body portion and a bottom portion movable relative to each other, one or more pivoted wings mounted to move with said bottom portion and arranged to be engaged by the body portion and swung thereby when the bottom portion is held stationary and the body portion moves toward the die, mechanism for moving said bottom portion toward the die, other mechanism for moving said body portion toward the die and relative to said bottom portion, whereby said wings are swung about their pivots.

12. In a machine of the kind described, the combination of a die and a plunger cooperating therewith, said plunger comprising a body portion and a bottom portion movable relative to each other, one or more pivoted wings mounted to move with said bottom portion and arranged to be engaged by the body portion and swung thereby when the bottom portion is held stationary and the body portion moves toward the die, mechanism for moving said bottom portion a predetermined distance toward the die, other mechanism for simultaneously moving both of said portions toward the die until said bottom portion is stopped in its movement and for thereafter moving the body portion further toward the die and relative to the bottom portion, whereby said wings are swung about their pivots.

13. In a machine of the kind described, the combination of a die and a plunger cooperating therewith, said plunger comprising a body portion and a bottom portion, mechanism for moving said bottom portion a predetermined distance toward the die, other mechanism for moving said bottom portion against the die, whereby the same is held stationary, said last named mechanism serving to move said body portion toward the die and relative to said bottom portion after the latter is held stationary, one or more pivoted wings mounted to move with said bottom portion and arranged to be engaged by the body portion and swung thereby when the bottom portion is held stationary and the body portion is moved relative thereto.

14. In a machine of the kind described, the combination of a die and a plunger cooperating therewith, said plunger comprising a body portion and a bottom portion movable relative to each other, yieldable locking means between said portions and means for adjusting said locking means to regulate the pressure at which the same will yield.

15. In a machine of the kind described, the combination of a die and a plunger cooperating therewith, said plunger comprising a body portion and a bottom portion movable relative to each other, yieldable means for locking said portions together with said bottom portion in advance of said body portion, mechanism for simultaneously moving said portions toward the die while they are locked together, said die having a part adapted to contact with and stop the movement of said bottom portion, whereby said locking means yields and permits said body portion to continue its movement toward the die, and means for adjusting said locking means to regulate the pressure at which the same will yield.

16. In a machine of the kind described, the combination of a die and a plunger for cooperating therewith, said plunger comprising a body portion and a bottom portion, means for moving said body portion toward and from said die, yieldable means for locking said bottom portion to said body portion when the latter is moved toward the die, and means carried by one of said portions and engaging the other to cause said portions to move together when said body portion is moved away from the die.

17. In a machine of the kind described, the combination of a die and a plunger for cooperating therewith, said plunger comprising a body portion and a bottom portion movable relative to each other, means for moving said body portion toward and from said die and means for causing said bottom portion to travel with said body portion as the latter moves away from the die, said last named means comprising a yieldable locking device carried by one of said portions and engaging the other portion.

18. In a machine of the kind described, the combination of a die and a plunger for cooperating therewith, a reciprocating member for moving said plunger toward and from said die, means for connecting said plunger to said member to permit limited lateral movement of the plunger relative to the member.

19. A construction as defined in claim 16 having resilient means for resisting said lateral movement of the plunger.

20. In a machine of the kind described, a die having one wall thereof movable laterally, mechanism for moving said wall, a plunger movable into and out of said die, a reciprocating member for moving said plunger into and out of the die, means connecting said plunger to said member to permit limited lateral movement of the plunger by said movable wall of the die.

21. In a machine of the kind described, a die having a bottom therein, a plunger adapted to contact with said bottom and move into said die, mechanism for operating said plunger toward and from the die, and other mechanism, operating in timed relation with said first named mechanism, for causing said bottom to recede into the die as said plunger moves into the die and to move outwardly when said plunger is withdrawn from the die.

22. In a machine of the kind described, the combination of a die and a plunger cooperating therewith, said plunger comprising a body portion and a bottom portion, yieldable means for locking said portions together with the bottom portion in advance of the body portion, and means for simultaneously moving said portions toward the die when thus locked together, and friction means carried by one of said portions and engaging the other portion.

23. In a machine of the kind described, the combination of a die and a plunger cooperating therewith, said plunger comprising a body portion and a bottom portion, yieldable means for locking said portions together with the bottom portion in advance of the body portion, means for simultaneously moving said portions toward the die when thus locked together, means for stopping the movement of said bottom portion while said body portion continues to move toward the die, thereby breaking said locking connection between said portions, means for moving said body portion away from the die and means carried by one of said portions and engaging the other, whereby said bottom portion is moved away from said die simultaneously with said body portion.

24. In a machine of the kind described, the combination of a die and a plunger cooperating therewith, means for moving said plunger toward and from the die, said plunger comprising a body portion and a bottom portion, yieldable means for locking said bottom portion of the plunger in advance of said body portion when the plunger is moved toward the die, said yieldable means also serving to lock said portions together when the plunger is moved away from the die.

25. In a machine of the kind described, the combination of a plunger and a die, said plunger comprising a body portion and a bottom portion movable relative to each other, yieldable means for locking said portions together with said bottom portion in advance of the body portion, means for moving said plunger toward the die with the bottom portion thus positioned in advance of the body portion, means associated with the die for stopping the movement of said bottom portion while said body portion continues to advance toward the die, whereby said body portion moves into proximity to said bottom portion, said yieldable means serving to lock said portions together when thus brought into proximity, and means for again forcing the bottom portion into position in advance of the body portion after the plunger has been moved away from the die.

26. A plunger for a box making machine comprising a body portion and a bottom portion, yieldable means for locking said portions together with the bottom portion in advance of the body portion, said yieldable means also serving to lock said portions together with the bottom portion in close proximity to the body portion.

In testimony whereof I hereunto affix my signature.

FRANK M. JOSLIN.